June 28, 1927.
C. L. MEYER
1,634,111
COLUMN CLAMP
Filed July 24, 1926
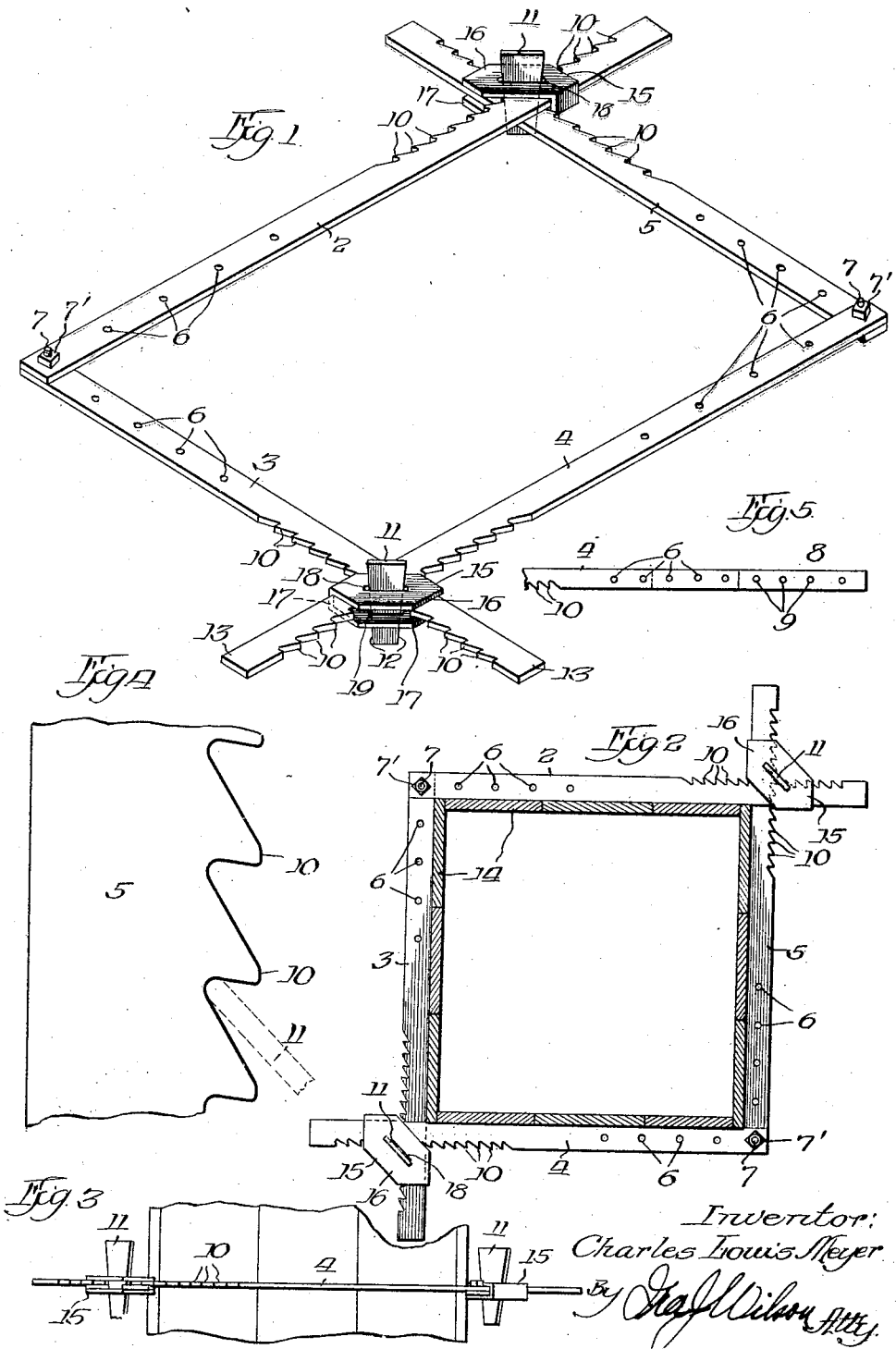

Patented June 28, 1927.

1,634,111

UNITED STATES PATENT OFFICE.

CHARLES LOUIS MEYER, OF OMAHA, NEBRASKA, ASSIGNOR TO CONCRETE ENGINEERING COMPANY, OF OMAHA, NEBRASKA, A CORPORATION OF NEBRASKA.

COLUMN CLAMP.

Application filed July 24, 1926. Serial No. 124,628.

The invention disclosed in this application pertains to concrete construction work primarily, and more particularly to a clamp for clamping the separable or several parts of a concrete or other plastic material form or mold together to tightly secure them in their proper places and relationships during the molding or pouring and setting of the concrete or other plastic mass.

One of the primary objects of the present invention is to provide a clamp mechanism of the above indicated character, adaptable for various types, sizes, and shapes of molds, a clamp arrangement adjustable to various sizes and shapes of mold or form, a wedging or tensioning device for a clamp of the nature specified, capable of drawing the various clamping members tightly against the surfaces or sides of the form or mold and of holding them rigidly in predetermined relation during the pouring, tamping, and setting periods in completing the plastic formation, and to provide a clamp and clamp wedging apparatus simple in construction, arrangement, and operation, and with a minimum number of parts so that it may be easily and economically manufactured, quickly adjusted and arranged, and applied with the least handling and labor.

Many other objects including the details of construction and the arrangement of the parts will be or should become readily appreciated after perusal of the following description and claims taken in connection with the drawing in which:

Fig. 1 is a perspective view of one form of clamp constructed in accordance with the invention, arranged to clamp a rectangular column.

Fig. 2 is a top plan view of the same clamp shown in Fig. 1 as it appears when applied to a square column which is shown in section.

Fig. 3 is a side elevational view of the column specified as shown in Fig. 2 with the clamp applied thereto.

Fig. 4 is a detail plan view of a portion of the toothed end of one of the clamping bars or arms as they will hereinafter be termed, and Fig. 5 is a plan view of one of the clamp arms showing how an extension bar or arm may be added or attached thereto.

Referring to the drawing, the clamp consists generally of arms 2, 3, 4, and 5, one arm for each side of the form or mold it supports and secures. While in this instance I have shown a clamp for a four sided column or form whether a column or not, it will be appreciated that with slight modification readily apparent to those skilled in the art, the clamp may be adapted for columns or forms of almost any exterior configuration. Preferably the arms are connected together in pairs such as 2 and 3, and 4 and 5, although this is not necessary since an additional bar may be interposed between, say, arms 2 and 3 for a five sided form, or both ends of each arm may be serrated or toothed for the reception of the wedging means as will more clearly appear hereafter.

Each of the arms 2, 3, 4, and 5 may be composed of strap iron or any other material suitable for the purpose, and while all are preferably of the same length for a regular sided form or mold, they need not be exactly the same length provided holes 6 and holes through which pivot bolts 7 pass, are regularly spaced the same distance from one another along their respective arms. These holes 6 and the holes through which the bolts 7 pass are arranged for adjustment of the pivotal connection provided by the bolt 7 along the length or longitudinally of the arms, in order that the arms may be adjusted relatively to conform properly in length to the width of the sides of the form or mold whether the latter be of the same or unequal length or width. If desired, any or all of the arms may be extended by adding an extension bar designated 8, suitably drilled with holes 9 spaced the same distance apart as the holes 6 in order that two or more of such holes may register with the holes 6 for connection of the extension bar to the arm by two or more bolts.

As above noted, one end of each arm is serrated or toothed as shown at 10 in order that a wedge 11, preferably having its edges 12 rounded, may be engaged thereby and held in place while it is driven in to spread the outer ends 13 of the intersecting arms apart, to thereby draw the inner edges of the arms between their points of overlapping or connection tightly against the board or other column form 14. Since I use but a single arm for each side of the clamp, it is necessary that these arms be held together and prevented from displacement away from one another where they overlap, and for this purpose I provide a U shaped member generally designated 15 which serves to clamp the arms together and also aids in securing the wedge in place.

Each of these members 15 is composed of two legs 16 and 17 joined together by a web, the inner face of which is preferably disposed parallel to the untoothed side or edge of the outer end portion of one of the arms, in order that this member may slide therealong freely to any desired adjusted position. The interior distance between the legs 16 and 17 of this U member is preferably a little wider than the total thickness of the two overlapped arms which it connects, in order that it may freely embrace such overlapped arms at their point of juncture. The legs 16 and 17 of the member 15 are longitudinally slotted with registering slots 18 and 19 in order that the wedges 11 may be received therethrough. These slots preferably extend perpendicularly to the bisector of the angle between the overlapped ends 13 in order that the rounded edges of the wedge 11 may properly engage in the recesses between the teeth 10 which are shaped as most clearly shown in Fig. 4 for the purpose.

In operation the pairs of arms 2 and 3, 4 and 5, are pivotally connected together with bolts 7 which are secured in place by nuts 7', the number of pairs of arms being determined by one half the number of sides of an even number sided form (for the four sided column form illustrated two pairs are used). Preferably two workmen are used to place the clamps about a square column, one supporting each pair of arms. When the clamps are in position each workman immediately places one of the clamp members 15 over the overlapped junction on the arms and inserts a wedge 11 through the slots 18 and 19 into engagement behind the relatively oppositely disposed teeth 10. It is then preferable to have one of the workmen grasp one pair of overlapped ends 13 and spread them apart as far as possible while the other workman removes the corresponding wedge 11 and reinserts it after the member 15 has been slid inwardly toward the center of the junction as far as possible. Thereafter the wedges are driven down as far as possible to urge the inner sides of the bars between the point of the overlapped ends and the pivotal connection tightly against the form sides. When it is desired to remove the apparatus from the form slight tapping on the small end of the wedge will release it so that it may be withdrawn and the clamp dismantled.

It will be obvious from the foregoing that very many modifications in construction and arrangement may be made without departing from the spirit of the invention and for this reason I do not desire to be limited to the details shown and described for illustrative purposes, but only by the spirit of the invention and the scope of the appended claims.

I claim:

1. In a clamp of the character described, intersecting arms, teeth formed in the edges of the outer ends of said arms, the toothed edge of one arm opposed to the toothed edge of the other arm, a member adapted to embrace said arms adjacent but outwardly of the point of intersection of their axes and means cooperative with said member and said toothed edges of said arms for urging the outer ends of said arms apart.

2. In a clamp of the character described, arms intersecting at the mold corners and means for urging the outer ends of said arms apart and their inner portions against the sides of the mold structure comprising, a U-shaped member independent of said arms adapted to embrace and secure them against vertical displacement from one another while allowing adjustment of said arms relatively along their lengths, and a single means cooperative with said member and the portions of the arms outward of their intersection adapted to tend to spread and hold the outer ends of the arms apart.

3. In a clamp of the character described, intersecting arms having teeth formed in the edges of the outer ends thereof, the toothed edge of one arm opposed to the toothed edge of the other arm outward of the intersection of the arms, a U-shaped member embracing said arms adjacent their intersection and provided with registering slots through the legs of the U, said slots lying outward of the center of intersection of the arms, and a single means adapted to pass through said slots and to engage the teeth of said arms for spreading said arms apart at their outer ends.

4. In a clamp of the character described, intersecting arms having teeth formed along one longitudinal edge of each, said arms being disposed so as to present the toothed edges toward one another outwardly of the center of intersection of the arms, a member for embracing said arms adjacent their intersection, said member having a slot substantially perpendicular to the bisector of the angle between said toothed edges and disposed outwardly of the center of intersection of said arms, and means adapted to pass through said slot and to engage said toothed edges of the arms for urging those portions of the arms inwardly of their intersection, against the sides of a mold.

5. In a clamp of the character described, a plurality of pairs of pivotally connected arms, a portion of one end of each arm of each pair having means permitting longitudinal adjustment of the pivotal connection, each arm having teeth along one edge adjacent its opposite end and adapted to overlap a similarly toothed edged end of an arm of an adjacent pair at a corner of a mold with the toothed edges of the arms beyond their point of overlapping presented toward one another, means for embracing each pair of overlapped arms, each of said means having a slot therethrough substantially perpendicular to the bisector of the angle between adjacent toothed edges and disposed outwardly of the center of overlap of the arms away from the mold, and means adapted to pass through said slot and to engage said toothed edges of the overlapped arms for urging portions of the arms between the overlap and pivot centers against the sides of the mold.

6. In a clamp of the character described, intersecting arms, teeth formed in the edges of the outer ends of said arms, the toothed edge of one arm opposed to the toothed edge of the other arm, a member adapted to embrace said arms adjacent but outwardly of the point of intersection of their axes and means cooperative with said member and said toothed edges of said arms for urging the outer ends of said arms apart, each of said arms being one arm of a pivotally connected pair of arms, one arm of each pair having means for adjustment of its pivot connection to the other arm thereof longitudinally therealong.

7. In a clamp of the character described, arms intersecting at the mold corners and means for urging the outer ends of said arms apart and their inner portions against the sides of the mold structure comprising, a U-shaped member independent of said arms adapted to embrace and secure them against vertical displacement from one another while allowing adjustment of said arms relatively along their lengths, and a single means cooperative with said member and the portions of the arms outward of their intersection adapted to tend to spread and hold the outer ends of the arms apart, each of said arms being one arm of a pivotally connected pair of arms, one arm of each pair having means for adjustment of its pivot connection to the other arm thereof longitudinally therealong.

8. In a clamp of the character described, intersecting arms having teeth formed in the edges of the outer ends thereof, the toothed edge of one arm opposed to the toothed edge of the other arm outward of the intersection of the arms, a U-shaped member embracing said arms adjacent their intersection and provided with registering slots through the legs of the U, said slots lying outward of the center of intersection of the arms, and a single means adapted to pass through said slots and to engage the teeth of said arms for spreading said arms apart at their outer ends, each of said arms being one arm of a pivotally connected pair of arms, one arm of each pair having means for adjustment of its pivot connection to the other arm thereof longitudinally therealong.

9. In a clamp of the character described, intersecting arms having teeth formed along one longitudinal edge of each, said arms being disposed so as to present the toothed edges toward one another outwardly of the center of intersection of the arms, a member for embracing said arms adjacent their intersection, said member having a slot substantially perpendicular to the bisector of the angle between said toothed edges and disposed outwardly of the center of intersection of said arms, and means adapted to pass through said slot and to engage said toothed edges of the arms for urging those portions of the arms inwardly of their intersection against the sides of a mold, each of said arms being one arm of a pivotally connected pair of arms, one arm of each pair having means for adjustment of its pivot connection to the other arm thereof longitudinally therealong.

In witness of the foregoing I affix my signature.

CHARLES LOUIS MEYER.